(12) United States Patent
Wang et al.

(10) Patent No.: US 7,303,318 B2
(45) Date of Patent: Dec. 4, 2007

(54) TEMPERATURE CONTROL METHOD AND DEVICE FOR A DISPLAY DEVICE

(75) Inventors: Bang-Ji Wang, Taipei (TW); Fu-Shiung Shih, Taichung County (TW); Shun-Chieh Yang, Taipei County (TW)

(73) Assignee: BENQ Corporation, Taoyuan (TW)

( * ) Notice: Subject to any disclaimer, the term of this patent is extended or adjusted under 35 U.S.C. 154(b) by 164 days.

(21) Appl. No.: 11/362,420

(22) Filed: Feb. 23, 2006

(65) Prior Publication Data

US 2006/0192727 A1    Aug. 31, 2006

(30) Foreign Application Priority Data

Feb. 25, 2005    (TW) .............................. 94105769 A

(51) Int. Cl.
*F21V 7/20*    (2006.01)
(52) U.S. Cl. ...................... 362/345; 362/373; 362/294; 353/57
(58) Field of Classification Search ................ 362/373, 362/264, 345; 353/57; 219/121.64; 700/278; 137/12, 14, 806
See application file for complete search history.

(56) References Cited

U.S. PATENT DOCUMENTS

| 5,539,633 | A * | 7/1996 | Hildebrand et al. ........... 700/32 |
| 6,709,111 | B2 * | 3/2004 | Hirao et al. ................... 353/52 |
| 6,775,991 | B2 * | 8/2004 | Evans et al. ................... 62/3.2 |
| 6,863,418 | B2 * | 3/2005 | Masuoka et al. ............ 362/264 |
| 7,181,318 | B2 * | 2/2007 | Wang et al. ................. 700/278 |
| 2006/0122740 | A1 * | 6/2006 | Law et al. .................... 700/300 |

* cited by examiner

*Primary Examiner*—Ali Alavi
(74) *Attorney, Agent, or Firm*—Quintero Law Office

(57) ABSTRACT

A temperature control method for a display device comprising a lamp box for emitting a light, a fan for cooling down the display device and a digital image device for receiving the light from the lamp box and forming an image, comprises acquiring an operating time of the lamp box; calculating a temperature offset in accordance with the operating time of the lamp box; acquiring a temperature value of the digital image device; calculating a control value in accordance to the temperature value and the temperature offset; controlling the fan in accordance with the control value.

18 Claims, 5 Drawing Sheets

| Using Time hr | 250 | 500 | 750 | 1000 | 1250 |
|---|---|---|---|---|---|
| Temperature Offset °C | 0.5 | 1 | 1.5 | 2 | 2.5 |
| Using Time hr | 1500 | 1750 | 2000 | 2250 | 2500 |
| Temperature Offset °C | 3 | 3.5 | 4 | 4.5 | 5 |

FIG. 3

TEMPERATURE CONTROL METHOD AND DEVICE FOR A DISPLAY DEVICE

BACKGROUND

The invention relates to a temperature control method and device for a display device, and more particularly to a temperature control method and device in accordance with the light magnitude decay of the lamp of the display device.

The light source of a projector and microdisplay rear-projection TV depends on the lamp therein. The light is reflected by a reflection device, such as a digital micromirror device, DMD, to project the image of the screen. The conventional design of the temperature control for the projector and microdisplay rear-projection TV utilizes a temperature sensor disposed on the reflection device to detect the temperature thereof and execute temperature control for the projector and microdisplay rear-projection TV.

The temperature of the reflection device varies in accordance with the light magnitude because the reflection device is operable to reflect the light from the lamp to the screen and the higher light magnitude is, the higher temperature of the reflection device is. Although the light magnitude of the lamp decays with increased operation, the power received by the lamp is constant, thus the heat received by the projector and microdisplay rear-projection TV is constant. The temperature sensor detects lower temperature due to the decay of the light magnitude and the temperature control in the projector and microdisplay rear-projection TV can not be performed appropriately, thus the elements therein may be damaged. The conventional to address this issue provides higher temperature tolerance, for example the original warning temperature is 65° C. but the actual warning temperature is 60° C. due to lamp decay considerations. Although the design can address the issue, a more appropriate solution is desirable.

SUMMARY

The invention provides a temperature control method and device for a display device, and more particularly to a temperature control method and device in accordance with the light magnitude decay of the lamp of the display device.

A temperature control method for a display device comprising a lamp box for emitting a light, a fan for cooling down the display device and a digital image device for receiving the light from the lamp box and forming an image, comprises acquiring an operating time of the lamp box; calculating a temperature offset in accordance with the operating time of the lamp box; acquiring a temperature value of the digital image device; calculating a control value in accordance to the temperature value and the temperature offset; controlling the fan in accordance with the control value.

A display device comprises a lamp box, a timer, a digital image device, a temperature sensor, a controller and a fan. The lamp box provides a light source required by the display. The timer counts and operating time of the lamp box. The digital image device receives the light from the lamp box and forming an image. The temperature sensor detects a temperature value near the digital image device. The controller evaluates a temperature offset in accordance with the operating time of the lamp box, and evaluates a control value in accordance to the temperature value and the temperature offset and outputting the voltage. The fan is controlled in accordance to the control value to cool down the digital image device.

DESCRIPTION OF THE DRAWINGS

FIG. 3 is a operating time to temperature offset table of lamp box 21 of FIG. 2.

DETAILED DESCRIPTION OF THE INVENTION

Figure 1:
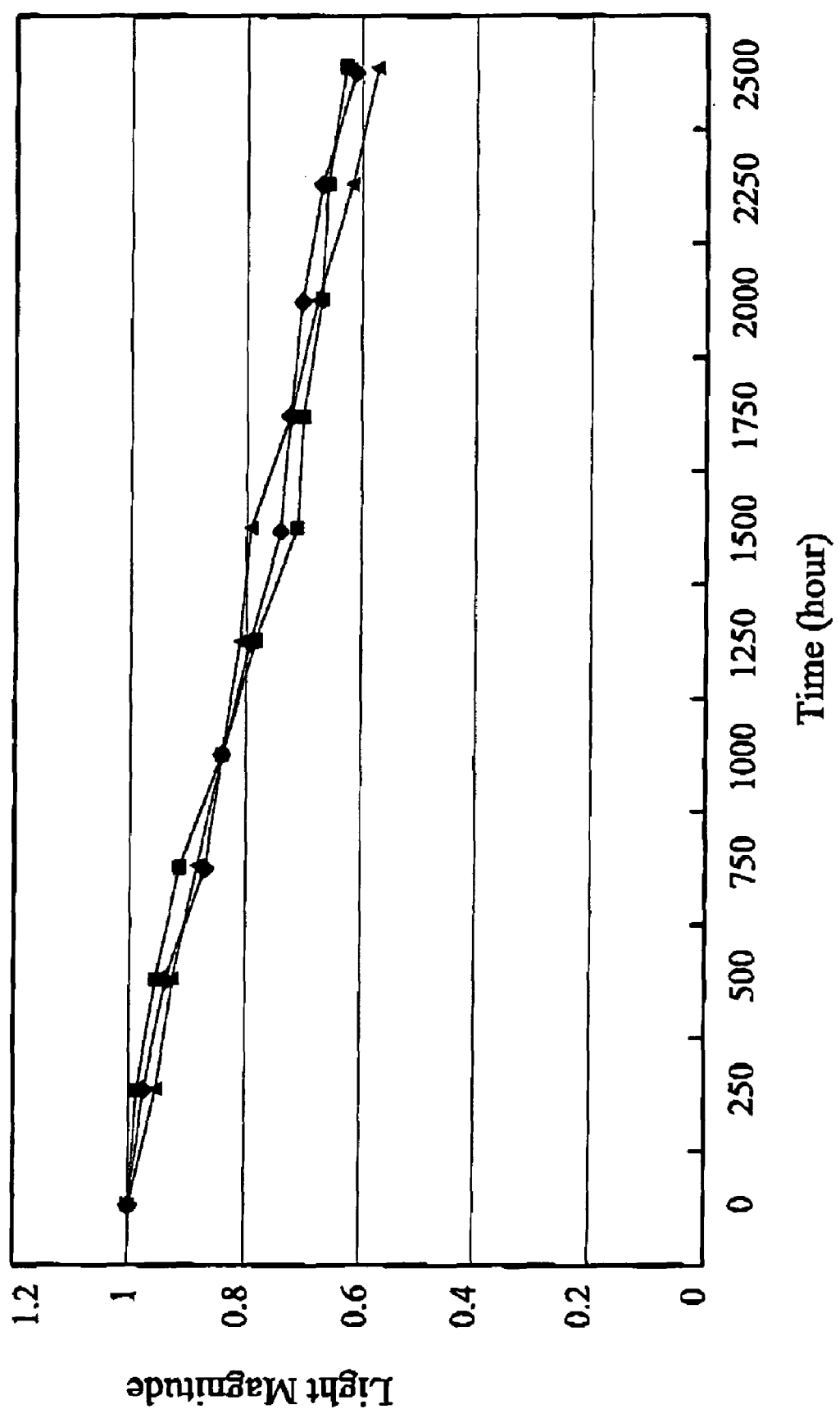
FIG. 1 is a time to light-magnitude scheme diagram of three types of lamps.

FIG. 1 is a time to light-magnitude scheme diagram of three types of lamps. At first, the original light magnitude is set to 1 and the light magnitude is measured every 250 hours to acquire a relative value to 1 under the condition that the lamp receives the constant power. Although the decay rate varies with different lamps, the result in FIG. 1 shows that the light magnitude of lamp received constant power decays with the operating time.

Figure 2:
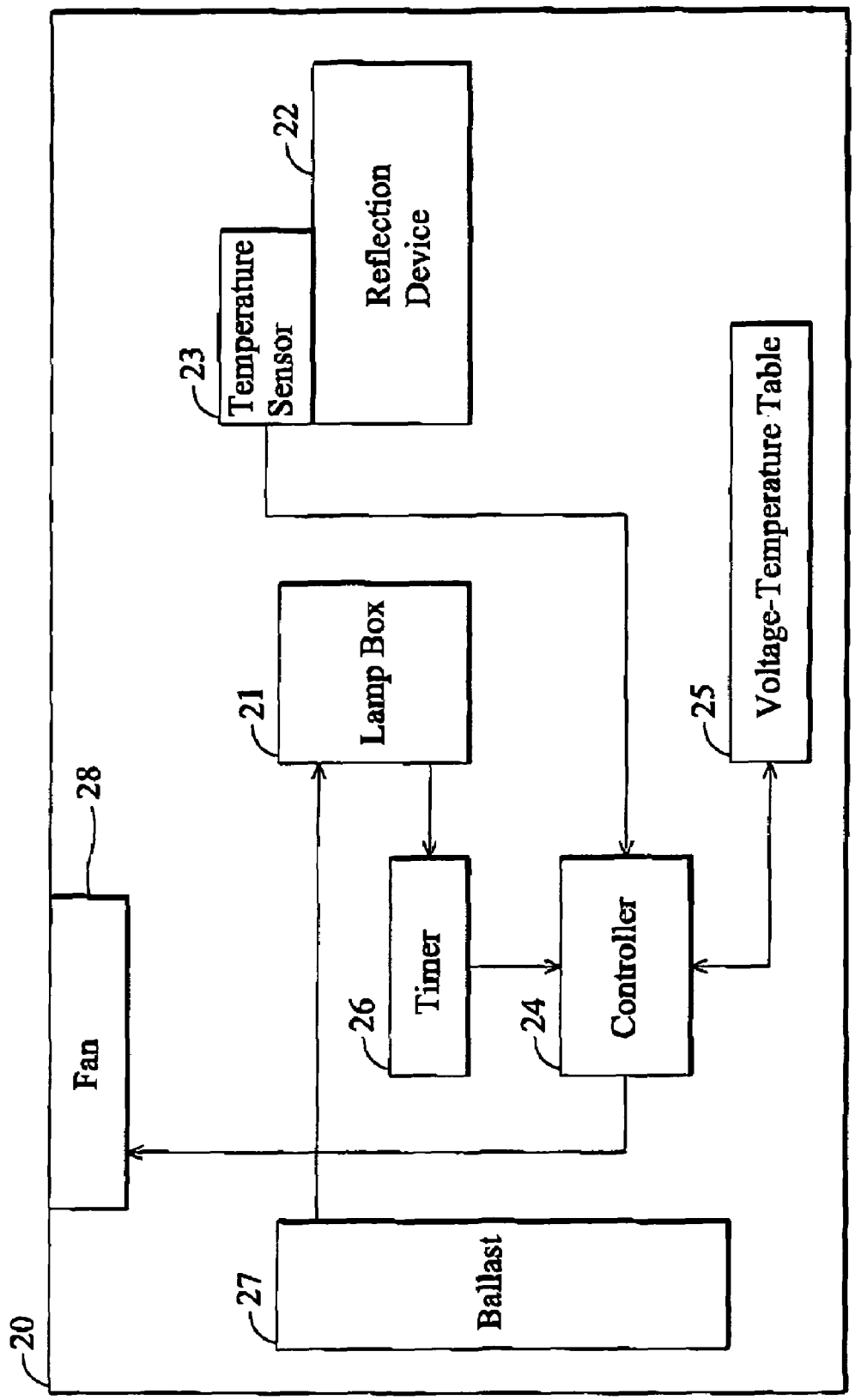
FIG. 2 is a schematic diagram according to an embodiment of the invention.

FIG. 2 is a schematic diagram according to an embodiment of the invention. Lamp box 21 provides light for projector 20 and the reflection device 22, preferably a digital micromirror device, DMD, reflects the light to project the image to the screen. Ballast 27 provides a constant power to lamp box 21. Timer 26 calculates and transmits an operating time of lamp box 21 to controller 24 to calculate a temperature offset in accordance with the operating time of lamp box 21. As to the calculation of the temperature offset, this embodiment illustrates the use of search tables, such as the tables in FIG. 3. FIG. 3 is an operating time to temperature offset table of lamp box 21 in FIG. 2. The lamp box 21 decays at about 0.5° C. per 250 hours according to the table in FIG. 3. The table in FIG. 3 takes 250 hours as a measuring time period for example but is not limited thereinto. Those skilled in the art will understand that the time period can be changed.

The reflection device 22 has higher temperature because it reflects the light from lamp box 21, thus a heat sink (not shown in FIGS.) is disposed on the reflection device to diffuse heat. A temperature sensor 23 disposed on the heat sink detects the temperature and transmits the temperature value to controller 24. The controller 24 searches the temperature offset table to acquire a temperature offset according to the operating time of lamp box 21 and calculating the temperature offset and the temperature value to get a first temperature value. In this embodiment, the controller 24 adds temperature offset and the temperature value to get the first temperature value and searches a voltage-temperature table 25 to obtain and output a voltage.

Figure 4:
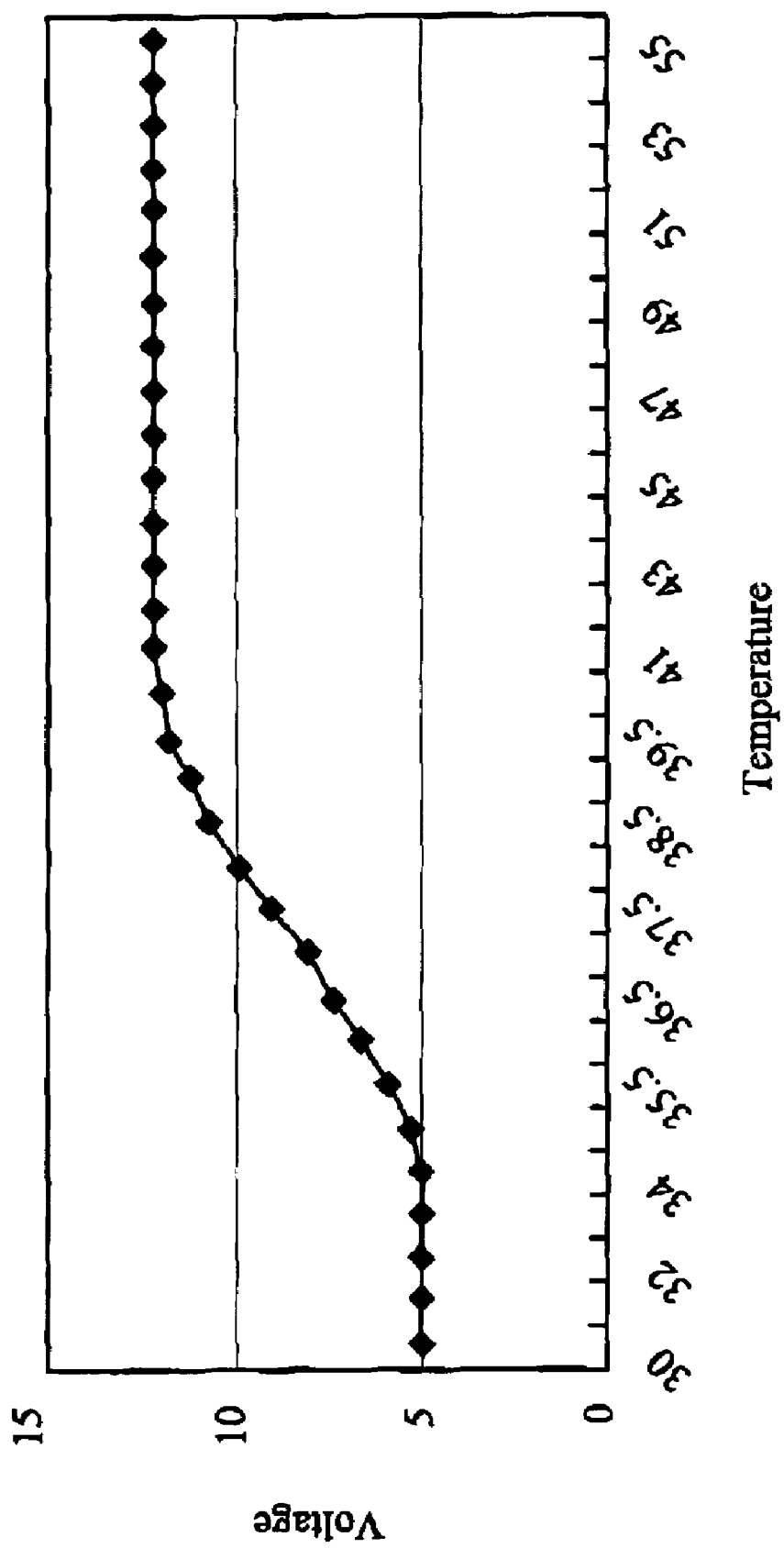
FIG. 4 is an embodiment of the voltage-temperature table 25 in FIG. 2.

FIG. 4 is an embodiment of the voltage-temperature table 25 in FIG. 2. In FIG. 4, the controller 24 outputs 5V when the first temperature value is lower than 35° C. and 12V when the first temperature value is higher than 42° C. The voltage-temperature table 25 samples the temperature value each 1° C. when the temperature is lower than 35° C. and higher than 42° C. and samples the temperature value each 0.5° C. for accurate temperature control when the temperature is lower than 42° C. and higher than 35° C. The voltage-temperature table 25, however is given as an example only, and is not limitative. Those skilled in the art will understand that the table can be set according to requirements.

Figure 5:
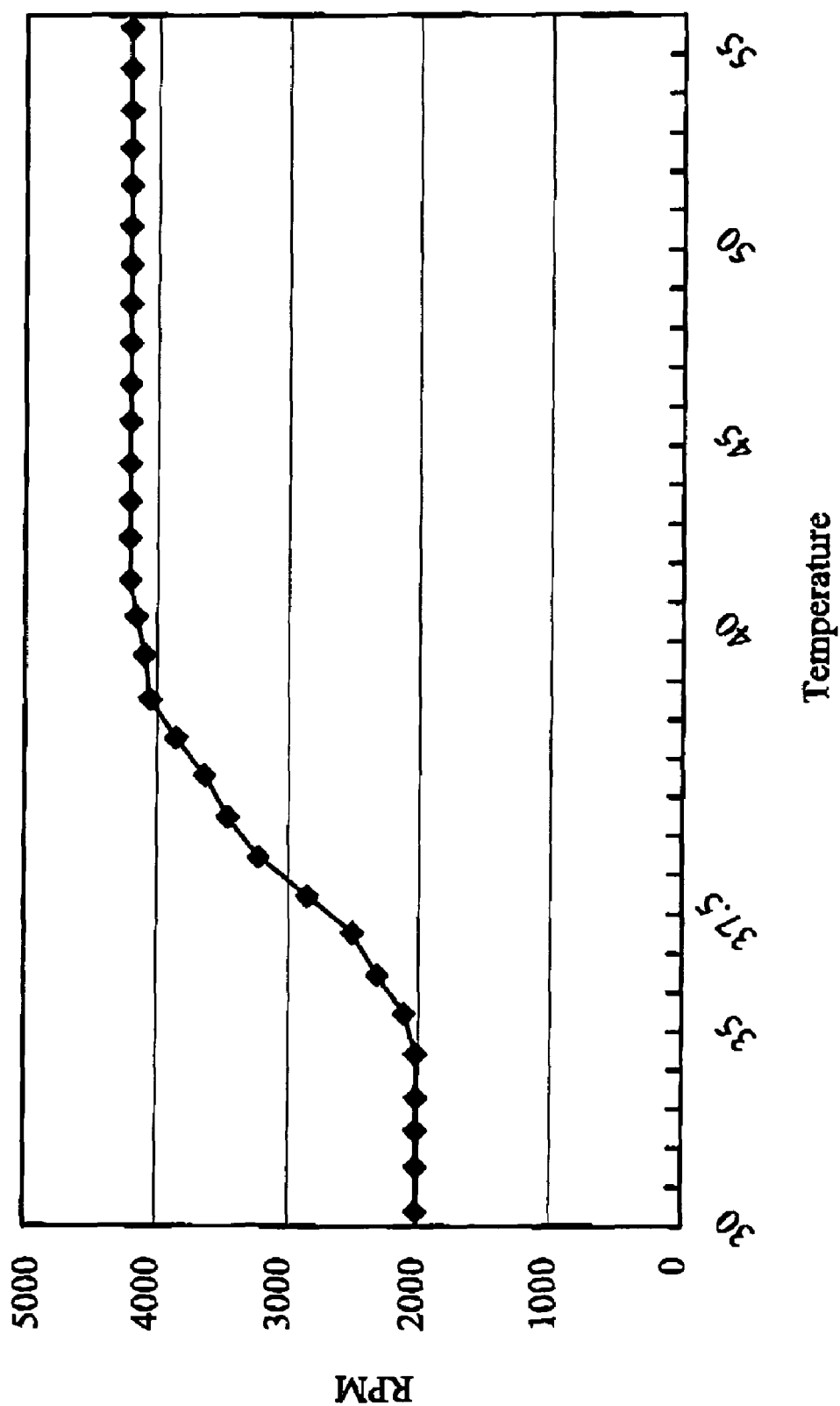
FIG. 5 is a fan RPM to temperature table according to an embodiment of the invention.

The Controller 24 searches a voltage-temperature table to acquire a voltage value according to the first temperature value and outputs the voltage to a fan 28 to diffuse heat in the projector 20. The fan 28 changes it RPM in accordance with the input voltage. Please refer to FIG. 5. FIG. 5 is a fan's RPM to temperature table according to an embodiment of the invention. When the first temperature is lower than 35° C., the fan 28 receives a voltage of 5V and its RPM is about 2000 RPM. When the first temperature is higher than 42° C., the fan 28 receives a voltage of 12V and rotates at about 4200 RPM. When the first temperature is between 35° C. and 42° C., the fan 28 has different RPM because of the different input voltage. The RPM value in the fan's RPM to temperature table is only an approximate value.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A temperature control method for a display device, the display device comprising a lamp box for emitting a light, a fan for cooling down the display device and a digital image device for receiving the light forming the lamp box and form an image, comprising the steps of:

acquiring an operating time of the lamp box;

evaluating a temperature offset in accordance with the operating time of the lamp box;

acquiring a temperature value of the digital image device; and evaluating a control value in accordance to the temperature value and the temperature offset; and controlling the fan in accordance with the control value.

2. The temperature control method of claim 1, further comprising providing a voltage-temperature table.

3. The temperature control method temperature control of claim 2, wherein the step of calculating a voltage value comprising:

evaluating a first temperature value in accordance to the temperature value and the temperature offset; and searching the voltage-temperature table to acquire the voltage value.

4. The temperature control method of claim 2, wherein the voltage-temperature table comprising a maximum voltage value and a minimum voltage value and the RPM of the fan in direct proportion to the voltage value.

5. The temperature control method of claim 4, wherein the minimum voltage value is the starting voltage of the fan.

6. The temperature control method of claim 4, wherein the maximum voltage value is the maximum load voltage of the fan.

7. The temperature control method of claim 1, wherein the control value is a voltage value.

8. The temperature control method of claim 1, wherein the digital image device is a reflection device for forming the image by reflecting the light from the lamp box.

9. The temperature control method of claim 1, wherein the digital image device is a digital micromirror device, DMD.

10. A display device, comprising:

a lamp box providing a light source required by the display;

a timer counting an operating time of the lamp box;

a digital image device receiving the light from the lamp box and forming an image;

a temperature sensor detecting a temperature value near the digital image device;

a controller evaluating a temperature offset in accordance with the operating time of the lamp box, and evaluating a control value in accordance to the temperature value and the temperature offset and outputting the voltage; and a fan being controlled in accordance to the control value to cool down the display device.

11. The display device of claim 10, further comprising a voltage-temperature table.

12. The display device of claim 10, wherein the controller evaluates a first temperature value in accordance to the temperature value and the temperature offset and searches the voltage-temperature table to acquire the voltage value.

13. The display device of claim 10, wherein the digital image device is a digital micromirror device, DMD.

14. The display device of claim 11, wherein the voltage-temperature table comprises a maximum voltage value and a minimum voltage value and the RPM of the fan is in direct proportion to the voltage value.

15. The display device of claim 14, wherein the minimum voltage value is the starting voltage of the fan.

16. The display device of claim 14, wherein the maximum voltage value is the maximum load voltage of the fan.

17. The temperature control method of claim 10, wherein the control value is a voltage value.

18. The temperature control method of claim 10, wherein the digital image device is a reflection device for forming the image by reflecting the light from the lamp box.

* * * * *